(No Model.)

S. SPITZER.
MANUFACTURE OF STARCH.

No. 361,788. Patented Apr. 26, 1887.

Witnesses:
Inventor:
Sigmund Spitzer,
By J. C. Brecht,
Attorney.

UNITED STATES PATENT OFFICE.

SIGMUND SPITZER, OF VIENNA, AUSTRIA-HUNGARY.

MANUFACTURE OF STARCH.

SPECIFICATION forming part of Letters Patent No. 361,788, dated April 26, 1887.

Application filed November 29, 1886. Serial No. 220,154. (No model.)

*To all whom it may concern:*

Be it known that I, SIGMUND SPITZER, a subject of the Emperor of Austria, residing at Vienna, in the Empire of Austria-Hungary, have invented certain new and useful Improvements in the Manufacture of Starch, &c.; and I do hereby declare the following to be a full, clear, and exact description of the invention, such as will enable others skilled in the art to which it appertains to make and use the same.

My invention relates to that class of inventions in which apparatus is employed for the manufacture of starch, and at the same time to gain the pasty substances produced during its manufacture for the manufacture of glue, sizing for wall-papers, &c., food for cattle, gluten for bread extract, paste for shoe-makers, &c.; and the object is to purify the starch and make it much whiter than has been the case heretofore; also, to remove the gummy or pasty substances, which are now left in the bran, refuse, &c., to produce glue, sizing, food for cattle, gluten, paste for shoe-makers, &c.; also, to entirely dispense with the use of chemicals in the manufacture of starch, and to employ only perfectly pure water.

The invention consists in certain apparatus and details of construction, as will be more fully described hereinafter, and more specifically pointed out in the claims, reference being had to the accompanying drawings, and the letters of reference marked thereon.

Like letters indicate similar parts in the different figures of the drawings, in which—

Figure 1:
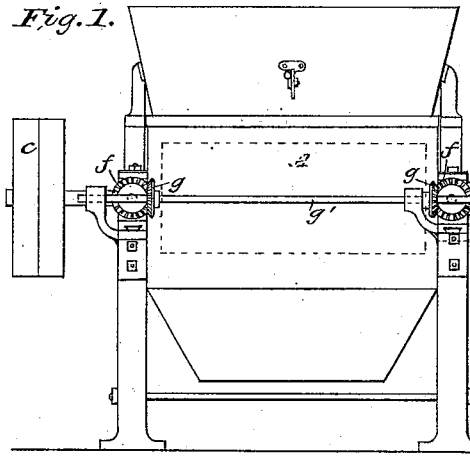
Figure 2:
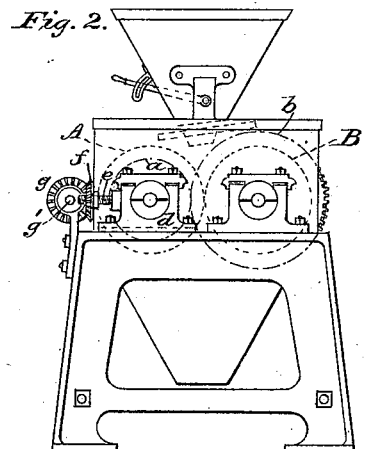
Figure 3:
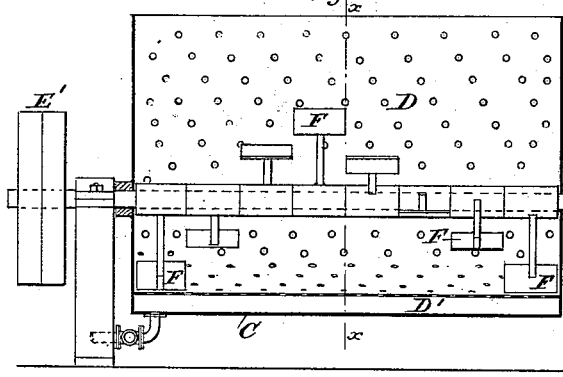
Figure 4:
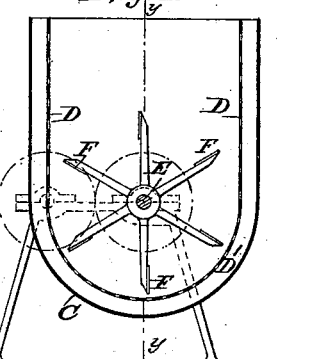
Figure 5:
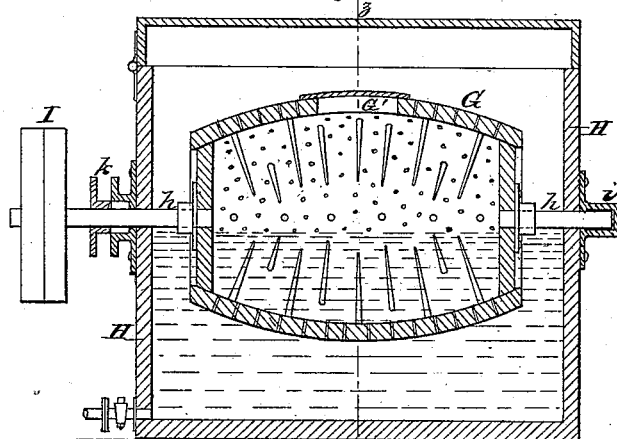
Figure 6:
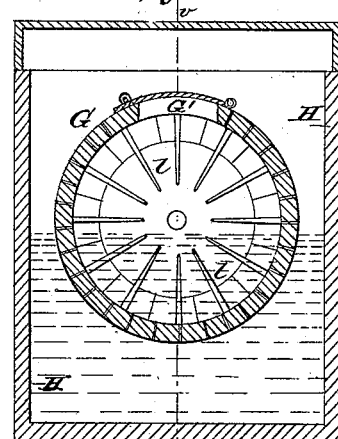

Figure 1 represents a side elevation of a pair of rollers for crushing the grain from which the starch is produced. Fig. 2 is an end elevation of the same. Fig. 3 is a longitudinal section on line *y y* of Fig. 4 of the apparatus in which the deleterious matter—such as bran, hulls, smut, &c.—is removed or washed out. Fig. 4 is a cross-section on line *x x* of Fig. 3. Fig. 5 is a longitudinal section on line *v v* of Fig. 6 of the apparatus in which the gummy substances are separated from the purified starch to produce glue or paste. Fig. 6 is a cross-section on line *z z* of Fig. 5.

In the drawings, A and B represent a pair of rollers (shown in dotted lines) for crushing the grain, automatically fed to them, and they are supported in a suitable frame-work or casing, and operated by a pair of gear-wheels, *a b*, of unequal diameter, so that one roller will revolve faster than the other, and they are driven by pulleys *c* on the end of one of the roller-shafts. The roller A is journaled in bearings *d*, having each a screw-threaded stud, *e*, secured to them, and upon said studs the bevel or miter wheels *f f* are fitted, and they mesh with the wheels *g g* on the shaft *g'*, having secured to it at one end a hand-wheel by which to operate said bevel-wheels, and thus to move the rollers close together or farther apart.

The grain is fed through the hopper and delivery-spout to the rollers and crushed, and the material for producing the starch, &c., is obtained. It is then introduced into the machine (shown in Figs. 3 and 4) in its impure state. This machine consists of a casing or shell, C, having a semi-circular or concave bottom, and in it a lining, D, provided with numerous perforations, is arranged, and a space, D', left between the lining and said casing. In the lining is placed a shaft, E, extending through both ends and supported in proper bearings, and operated by gearing and pulleys E'. The shaft E is provided with numerous beaters or mixers, F, placed spirally around the shaft. The material, with a proper quantity of pure water, supplied in sufficient quantity to form a paste, is introduced into said lining, and the purified material is forced through the perforations into the space D', from which it is removed by tilting the shell C, or in other suitable manner, and the purified starch is conveyed to proper receptacles. The gummy or glutinous substances, as well as the refuse, &c., are then conveyed to the machine shown in Figs. 5 and 6. This machine consists of a barrel-shaped, elliptical or cylindrical vessel or drum, G, of any suitable material, and is arranged in a casing or receptacle, H, containing pure water, without any chemicals whatever, as heretofore. The vessel G is provided with stud-shafts *h*, secured to its heads, and is revolved by a pulley, I, in a journal, *i*, at one end, and passes through a stuffing-box, *k*, at the other end, to prevent leakage. The vessel G is provided with numerous perforations, through which the fine bran, smut, or deleterious matters are passed or forced, while the gummy substances are retained in the vessel. They are formed into balls or lumps by the rotation of the vessel, and are constantly separated or disintegrated by numerous inwardly-projecting pins or cutters, $l$. From said balls or lumps all bran, &c. is thoroughly extracted and out of them the glue, sizing, &c., is produced.

The vessel G may have wooden heads and a metal body, and, if made very long, be provided with intermediate spiders or braces, to prevent collapsing and to support the shaft at intervals.

A man or hand hole, G', is provided to introduce the material as well as for cleaning the interior of the vessel, or for other purposes.

It will be readily seen by those skilled in the art that by these means a very superior starch is produced having a very white and much finer appearance than in any other manner heretofore employed, and, as no chemicals whatever are used, but only pure water, it is of a much better and finer quality. As it is of perfectly unadulterated and pure quality, a new breadstuff can be produced out of the gluten, which, as is well known, is the main substance with all breadstuffs. It produces a very sweet, nutritious, and easily digested food for animals, on account of its purity. It prevents sickness and diseases when fed to cattle, as all the gummy, pasty, or other deleterious matter is entirely removed and without the use of chemicals, and thus also prevents fermenting. It forms a superior paste for shoe-makers, saddlers, or other leather-workers, and also an excellent sizing for wall and other papers.

The substances now forming the refuse and objectionable deleterious matter are by my apparatus formed into a glue or paste of very superior quality, producing the very quintescence of glue, while the bran, &c., can safely be fed to cattle, or be employed for other useful purposes.

I am aware of the Patents No. 79,365 to Macadam, No. 27,536 to Embree, and No. 235,517 to Daverio, and disclaim the construction therein shown; but,

Having thus described my invention, what I claim is—

In the manufacture of starch, a perforated ellipsoidal drum provided with inwardly-converging projecting pins, and placed in a receptacle containing pure water, substantially as and for the purpose specified.

In testimony whereof I hereby affix my signature in presence of two witnesses.

SIGMUND SPITZER.

Witnesses:
 WM. A. RUESS,
 FRITZ W. REUTER.